3,338,796
CONVERTING VERATRALDEHYDE TO L(-)3,4-DIMETHOXYPHENYLACETYL CARBINOL
John W. Rothrock, Watchung, N.J., assignor to Merck & Co., Inc., Rahway, N.J., a corporation of New Jersey
No Drawing. Continuation of abandoned application Ser. No. 390,502, Aug. 19, 1964. This application Oct. 13, 1966, Ser. No. 586,352
1 Claim. (Cl. 195—28)

This application is a continuation of Ser. No. 390,502 filed Aug. 19, 1964 and now abandoned.

This invention relates to a fermentation process for the stereospecific preparation of a compound of the formula

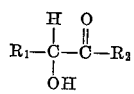

in th L configuration whrein $R_1$ is a phenyl ring substituted in the 3 and 4 positions by hydroxy, lower alkoxy or alkylenedioxy radicals and $R_2$ is an alkyl substituent. More specifically, it relates to the production of L(-)3,4-dimethoxyphenylacetyl carbinol, L(-)3-methoxy-4-hydroxyphenylacetyl carbinol and L(-)3,4-methylenedioxyphenylacetyl carbinol.

The compounds produced in accordance with my invention are useful as intermediates in the stereospecific synthesis of L-α-methyl-3,4-dihydroxyphenylalanine, a valuable agent in the treatment of hypertension. The corresponding D-isomer of α-methyl-3,4-dihydroxyphenylalanine has no utility in the treatment of hypertension. Thus, the present invention provides intermediates which are useful in producing almost exclusively the L-isomer of the valuable α-methyl-3,4-dihydroxyphenylalanine and none of the undesired D-isomer. In contrast, previous syntheses of the compound involved the necessity of carrying out a resolution of optical isomers at some stage in order to separate the wanted from the unwanted isomer.

I have found that the compounds of my invention, which are stereospecifically produced by a microbiological process in the L configuration may be converted stereospecifically to L-α-methyl-3,4-dihydroxyphenylalanine.

Thus, the L-isomer of the 3,4-disubstituted-phenylacetyl carbinols is reacted in solution with a water-soluble cyanide salt and ammonium carbonate to form an oxazolidinone compound in predominantly the L-stereoisomeric form. The reaction of, for example, L(-)3,4-dimethoxyphenylacetyl carbinol results in the production of 4-carbamoyl-4-methyl-5(3,4-dimethoxyphenyl)-2-oxazolidinone in which the asymmetric carbon attached to the carbinol substituent is in the desired L configuration. When the derived oxazolidinone compound is heated at reflux with hydrogen iodide and red phosphorus in aqueous acetic acid there is produced L-α-methyl-3,4-dihydroxyphenylalanine.

In accordance with my invention a 3,4-disubstituted benzaldehyde compound, wherein the 3 and 4 substituents are hydroxy, alkoxy, or when taken together an alkylenedioxy (e.g., methylenedioxy) substituent, is contacted with a growing culture of an acyloin-producing microorganism at a temperature of about 25–30° C. and the L-acyloin produced is isolated from the fermentation broth by extraction, chromatography and crystallization.

The acyloin-producing microorganisms utilized in the process of my invention are preferably commercially available yeast strains ordinarily employed as "wet compressed yeast" in the baking and brewing industries, in particular selected strains of Saccharomyces cerevisiae. In addition, selected strains of microorganisms belonging to the Schizomycetes, Myxomycetes, and Eumycetes are effective in carrying out the desired stereospecific conversion to the L-acyloin.

For any given species of microorganism it is necessary to select acyloin-producing strains of microorganisms, by a simple test. This test includes growing the selected microorganism in contact with a 3,4-disubstituted-benzaldehyde, and filtering and extracting the fermentation broth with ethyl acetate. A portion of the extract is then spotted on filter paper and chromatographed using n-butanol saturated with 3% aqueous ammonium hydroxide solution. A positive blue tetrazolium spot test indicates the presence of the desired acyloin and the strains showing a positive tetrazolium test are then utilized in the fermentation process to produce the compounds of my invention.

In accordance with the process of my invention, a suitable sterile nutrient medium containing assimilable sources of carbon and nitrogen are inoculated with a selected strain of microorganism and aerated and agitated until substantial growth of the microorganism has occurred. Generally, a period of 1–7 days is required. Typical media utilized in the process of my invention are indicated in the following tables.

MEDIUM I

Molasses—6 grams
Water—sufficient to make 100 ml.
pH adjusted to 5.5 with phosphoric acid

MEDIUM II

| | G. |
|---|---|
| Commercial yeast extract | 20 |
| Dextrose | 20 |
| $MgSO_4$–$7H_2O$ | 0.5 |
| $KH_2PO_4$ | 0.2 |
| $Na_2HPO_4$ | 0.2 |

Water (sufficient to make 1.0 liter).
pH adjusted to 7.

Following the growth period, the selected 3,4-disubstituted-benzaldehyde is added to the medium in a concentration of approximately 1–10 g. of the compound per liter of medium, and the medium containing the test compound incubated with agitation at about 28° C. for a period of from 1–10 hours.

Following the incubation period, the fermented broth containing the desired compound along with other products of metabolism is extracted with a water-immiscible solvent for the acyloin such as an ester of a lower aliphatic acid, preferably ethyl acetate.

The solvent extract contains, in addition to the desired acyloin, unreacted aldehyde as well as the corresponding substituted benzyl alcohol and the substituted benzoic acid. The desired acyloin compound is separated from the related compounds by processes including partition chromatography on an inert material such as diatomaceous earth, by fractional crystallization and by extraction with aqueous soduim bisulfite solution.

The following examples are illustrative of the process of my invention.

*Example 1.—Vanillin acyloin (L-3-methoxy-4-hydroxyphenylacetyl carbinol)*

A fermentation medium having the composition of Medium II is inoculated with a strain of *Saccharomyces cerevisiae* selected from a commercial wet compressed yeast available from the Atlantic Yeast Company. The medium is then aerated and agitated at 28° C. for approximately 48 hours to achieve optimal growth of the *Saccharomyces cerevisiae* organisms. Aeration and agitation are stopped, and to the medium is added vanillin in a concentration of 4 grams per liter of medium. Following introduction of the vanillin, the medium is again aerated and agitated at 28° C. for a period of about 7 hours to produce the desired L-3,4-methylenedioxyphenylacetyl carbinol.

The resulting fermentation broth containing the desired product is sterilized by autoclaving and then filtered to remove the yeast cells. The filtrate containing the product is then saturated with sodium chloride and extracted four times with ⅓ volume of ethyl acetate. The crude product is obtained by evaporation of the ethyl acetate leaving a brown oil containing the product in crude form admixed with by-products.

Vanillyl alcohol, one of the by-products of the fermentation process, is removed from the crude product by crystallization from an ethyl acetate-petroleum ether solution of the crude oily residue. The desired product remains dissolved in the mother liquors of the crystallization. The solvents are removed from these mother liquors by evaporation and the residual oil is subjected to partition column chromatography using diatomaceous earth as the support phase and using a solvent mixture of benzene:ethylacetate:methyl alcohol:water in the proportion (9:1:5:5) as the mobile phase. The fractions which are eluted from the column in succession are vanillyl alcohol, vanillin and a mixture of vanillic acid and the desired L-3-methoxy-4-hydroxyphenylacetyl carbinol.

The last fraction containing the mixture of the desired product with vanillic acid is fractionally crystallized from a mixture of ethyl acetate-petroleum ether to remove the vanillic acid from the mixture. The mother liquors of the crystallization containing the product are further purified by extraction by aqueous sodium bisulfite solution to extract the acetyl carbinol as a bisulfite. The bisulfite addition product is decomposed by the addition of an excess of an aqueous solution of sodium carbonate and the desired compound extracted with ethyl acetate. The ethyl acetate extract of the product is evaporated to a small volume, whereupon L-3-methoxy-4-hydroxyphenylacetyl carbinol crystallizes. M.P. 69–73° C.; $[\alpha]_D^{23}=211°$ (c.=1.02% acetone).

*Example 2.—Veratryl acyloin (L-3,4-dimethoxyphenylacetyl carbinol)*

The procedure of Example 1 is repeated using *Aerobacter aerogenes* A.T.C.C. No. 211 as the fermenting microorganism and employing veratraldehyde as the substrate in a concentration of 4 grams per liter in place of the vanillin used in the preceding example. The fermentation liquor, following the incubation period, is filtered to remove the cell bodies and extracted with ethyl acetate, aqueous bisulfite solution. The ethyl acetate extract containing the product is subjected to partition column chromatography on diatomaceous earth employing as the mobile phase a solvent system having a composition petroleum ether:benzene:methyl alcohol:water in the ratio of (6:4:5:5). The material obtained is L-3,4-dimethoxyphenylacetyl carbinol substantially free of veratraldehyde and veratryl alcohol.

*Example 3.—Piperonal acyloin (L-3,4-methylenedioxyphenylacetyl carbinol*

The procedure of Example 1 is repeated using as the fermenting microorganism a selected filtrate of *Saccharomyces cerevisiae* obtained from a commercially available sample of wet compressed yeast and utilizing as the substrate, in place of the vanillin used in Example 1, piperonal in a concentration of 10 grams of piperonal per liter of fermentation medium. The desired product is purified by extraction with ethyl acetate, and aqueous bisulfite followed by partition column chromatography and fractional crystallization from ethyl acetate solution to give substantially pure L-3,4-methylenedioxyphenylacetyl carbinol. M.P. 44–46° C.; $[\alpha]_D^{25}=228°$; c.=1.2 ethyl acetate.

Similarly, when 3,4-dihydroxybenzaldehyde is used instead of piperonal, the corresponding phenylacetyl carbinol is obtained.

What is claimed is:

A stereospecific method of producing L(-)3,4-dimethoxyphenylacetyl carbinol which comprises intimately contacting veratraldehyde with a growing acyloin-producing culture of *Aerobacter aerogenes* A.T.C.C. No. 211 and isolating the resulting product by extraction and crystallization.

No references cited.

A. LOUIS MONACELL, *Primary Examiner.*

A. E. TANENHOLTZ, *Assistant Examiner.*